(12) United States Patent
Yankovich et al.

(10) Patent No.: US 10,891,685 B2
(45) Date of Patent: Jan. 12, 2021

(54) EFFICIENT RENDERING OF 3D MODELS USING MODEL PLACEMENT METADATA

(71) Applicant: eBay Inc., San Jose, CA (US)

(72) Inventors: Steve Yankovich, San Jose, CA (US); Andrew Chalkley, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/189,720

(22) Filed: Nov. 13, 2018

(65) Prior Publication Data

US 2019/0156582 A1 May 23, 2019

Related U.S. Application Data

(60) Provisional application No. 62/588,189, filed on Nov. 17, 2017.

(51) Int. Cl.
*G06Q 30/06* (2012.01)
*G06Q 30/02* (2012.01)
(Continued)

(52) U.S. Cl.
CPC ..... *G06Q 30/0643* (2013.01); *G06K 9/00288* (2013.01); *G06K 9/00671* (2013.01);
(Continued)

(58) Field of Classification Search
CPC .............. G06T 19/006; G06T 2215/16; G06Q 30/0643; G06F 3/011
See application file for complete search history.

(56) References Cited

U.S. PATENT DOCUMENTS 5,347,306 A 9/1994 Nitta
6,202,051 B1 3/2001 Woolston
(Continued)

FOREIGN PATENT DOCUMENTS

EP 2259225 A1 12/2010
WO 2001/075731 A1 10/2001
(Continued)

OTHER PUBLICATIONS

International Search Report received for PCT Application No. PCT/US2018/061139, dated Feb. 14, 2019, 4 pages.
(Continued)

*Primary Examiner* — Jeffery A Brier
(74) *Attorney, Agent, or Firm* — SBMC

(57) ABSTRACT

Model placement metadata is defined and stored for a three-dimensional ("3D") model. The model placement metadata specifies constraints on the presentation of the 3D model when rendered in a view of a real-world environment, such as a view of a real-world environment generated by wearable computing device like an augmented reality ("AR") or virtual reality ("VR") device. A wearable computing device can analyze the geometry of a real-world environment to determine a configuration for the 3D model that satisfies the constraints set forth by the model placement metadata when the 3D model is rendered in a view of the environment. Once the configuration for the 3D model has been computed, the wearable device can render the 3D model according to the displayed configuration and display the rendering in a view of the real-world environment.

20 Claims, 10 Drawing Sheets

(51) Int. Cl.
*G06Q 30/00* (2012.01)
*G06K 9/00* (2006.01)

(52) U.S. Cl.
CPC ............ *G06Q 30/00* (2013.01); *G06Q 30/02* (2013.01); *G06Q 30/0241* (2013.01); *G06Q 30/0278* (2013.01); *G06Q 30/06* (2013.01); *G06Q 30/0601* (2013.01); *G06Q 30/0603* (2013.01); *G06Q 30/0627* (2013.01); *G06Q 30/0631* (2013.01); *G06T 2215/16* (2013.01)

(56) References Cited

U.S. PATENT DOCUMENTS

| | | | |
|---|---|---|---|
| 6,813,612 | B1 | 11/2004 | Rabenold et al. |
| 8,223,156 | B2 | 7/2012 | Boss et al. |
| 8,285,638 | B2 | 10/2012 | Jung et al. |
| 8,924,880 | B2 | 12/2014 | Altberg et al. |
| 8,965,460 | B1 | 2/2015 | Rao et al. |
| 9,111,285 | B2 | 8/2015 | Amidon et al. |
| 9,286,727 | B2 | 3/2016 | Kim et al. |
| 9,336,541 | B2 | 5/2016 | Pugazhendhi et al. |
| 9,449,342 | B2 | 9/2016 | Sacco |
| 9,588,342 | B2 | 3/2017 | Grigg et al. |
| 9,870,716 | B1 | 1/2018 | Rao et al. |
| 10,509,962 | B2 | 12/2019 | Zheng et al. |
| 2002/0128952 | A1 | 9/2002 | Melkomian et al. |
| 2003/0126068 | A1 | 7/2003 | Hauk et al. |
| 2005/0119963 | A1 | 6/2005 | Ko |
| 2008/0091692 | A1 | 4/2008 | Keith et al. |
| 2008/0147566 | A1 | 6/2008 | Malik |
| 2008/0208749 | A1 | 8/2008 | Wallace et al. |
| 2009/0063983 | A1 | 3/2009 | Amidon et al. |
| 2010/0079467 | A1 | 4/2010 | Boss et al. |
| 2010/0235715 | A1 | 9/2010 | Thatcher et al. |
| 2011/0040645 | A1 | 2/2011 | Rabenold et al. |
| 2011/0072367 | A1 | 3/2011 | Bauer |
| 2011/0270701 | A1 | 11/2011 | Black et al. |
| 2012/0084168 | A1 | 4/2012 | Adair et al. |
| 2012/0084169 | A1 | 4/2012 | Adair et al. |
| 2012/0246036 | A1 | 9/2012 | Marr et al. |
| 2013/0159110 | A1 | 6/2013 | Rajaram et al. |
| 2013/0257877 | A1 | 10/2013 | Davis |
| 2013/0293530 | A1 | 11/2013 | Perez et al. |
| 2013/0293580 | A1 | 11/2013 | Spivack |
| 2014/0040004 | A1 | 2/2014 | Hamo et al. |
| 2014/0058812 | A1 | 2/2014 | Bender et al. |
| 2014/0100991 | A1 | 4/2014 | Lenahan et al. |
| 2014/0130076 | A1 | 5/2014 | Moore et al. |
| 2014/0143081 | A1 | 5/2014 | Finkelstein et al. |
| 2014/0172570 | A1 | 6/2014 | Arcas et al. |
| 2014/0214547 | A1 | 7/2014 | Signorelli et al. |
| 2014/0267228 | A1* | 9/2014 | Ofek ........................ G06T 19/20 345/419 |
| 2014/0267311 | A1 | 9/2014 | Evertt et al. |
| 2014/0279164 | A1 | 9/2014 | Friedman |
| 2014/0279263 | A1 | 9/2014 | Liu et al. |
| 2014/0282220 | A1 | 9/2014 | Wantland et al. |
| 2014/0306994 | A1 | 10/2014 | Brown et al. |
| 2015/0070347 | A1 | 3/2015 | Hofmann et al. |
| 2015/0073907 | A1 | 3/2015 | Purves et al. |
| 2015/0356774 | A1 | 12/2015 | Gal et al. |
| 2015/0379460 | A1 | 12/2015 | Zamer |
| 2016/0012475 | A1 | 1/2016 | Liu |
| 2016/0189426 | A1 | 6/2016 | Thomas et al. |
| 2016/0275723 | A1 | 9/2016 | Singh |
| 2016/0378861 | A1 | 12/2016 | Eledath et al. |
| 2017/0091844 | A1 | 3/2017 | Yarvis et al. |
| 2017/0132841 | A1 | 5/2017 | Morrison |
| 2017/0256096 | A1 | 9/2017 | Faaborg et al. |
| 2017/0346776 | A1 | 11/2017 | Valla |
| 2017/0358138 | A1* | 12/2017 | Dack ..................... G06T 19/006 |
| 2018/0096528 | A1* | 4/2018 | Needham .................. G06T 7/70 |
| 2018/0114329 | A1 | 4/2018 | Wexler et al. |
| 2018/0114372 | A1* | 4/2018 | Nagy ................. G06F 3/04842 |
| 2018/0181997 | A1 | 6/2018 | Sanjeevaiah et al. |
| 2018/0336732 | A1* | 11/2018 | Schuster ........ G06Q 10/063118 |
| 2019/0080171 | A1 | 3/2019 | Zheng et al. |
| 2019/0156377 | A1 | 5/2019 | Yankovich et al. |
| 2019/0156393 | A1 | 5/2019 | Yankovich |
| 2019/0156403 | A1 | 5/2019 | Yankovich et al. |
| 2019/0156410 | A1 | 5/2019 | Yankovich et al. |
| 2020/0065588 | A1 | 2/2020 | Zheng et al. |

FOREIGN PATENT DOCUMENTS

| | | | |
|---|---|---|---|
| WO | 2012/044680 | A1 | 4/2012 |
| WO | 2013/166360 | A2 | 11/2013 |
| WO | 2016/118339 | A1 | 7/2016 |
| WO | 2016/210354 | A1 | 12/2016 |
| WO | WO-2018108536 | A1 * | 6/2018 ............. G06T 19/20 |
| WO | 2019/055352 | A1 | 3/2019 |
| WO | 2019/099581 | A1 | 5/2019 |
| WO | 2019/099585 | A1 | 5/2019 |
| WO | 2019/099590 | A1 | 5/2019 |
| WO | 2019/099591 | A1 | 5/2019 |
| WO | 2019/099593 | A1 | 5/2019 |

OTHER PUBLICATIONS

Written Opinion received for PCT Patent Application No. PCT/US2018/061139, dated Feb. 14, 2019, 7 pages.
International Search Report received for PCT Application No. PCT/US2018/061145, dated Feb. 14, 2019, 4 pages.
International Search Report received for PCT Application No. PCT/US2018/061151, dated May 2, 2019, 3 pages.
Written Opinion received for PCT Patent Application No. PCT/US2018/061151, dated May 2, 2019, 7 pages.
International Search Report received for PCT Application No. PCT/US2018/061152, dated Feb. 4, 2019, 3 pages.
Written Opinion received for PCT Patent Application No. PCT/US2018/061152, dated Feb. 4, 2019, 5 pages.
International Search Report received for PCT Application No. PCT/US2018/061154, dated Feb. 14, 2019, 4 pages.
Written Opinion received for PCT Patent Application No. PCT/US2018/061154, dated Feb. 14, 2019, 7 pages.
Xu, et al., Constraint-Based Automatic Placement for Scene Composition, Proceedings of Graphics Interface 2002, Jan. 1, 2002, 10 pages.
Written Opinion received for PCT Patent Application No. PCT/US2018/061145, dated Feb. 14, 2019, 8 pages.
Non Final Office Action Received for U.S. Appl. No. 16/189,849, dated Apr. 29, 2020, 43 pages.
International Preliminary Report on Patentability Received for Application No. PCT/US2018/061139, dated May 28, 2020, 9 pages.
International Preliminary Report on Patentability received for PCT Application No. PCT/US2018/061145, dated May 28, 2020, 10 pages.
International Preliminary Report on Patentability received for PCT Application No. PCT/US2018/061151, dated May 28, 2020, 9 pages.
International Preliminary Report on Patentability Received for PCT Application No. PCT/US2018/061152, dated May 28, 2020, 7 pages.
International Preliminary Report on Patentability received for PCT Application No. PCT/US2018/061154, dated May 28, 2020, 9 pages.
Non-Final Office Action Received for U.S. Appl. No. 16/189,674, dated Aug. 18, 2020, 16 pages.
Applicant Initiated Interview Summary Received for U.S. Appl. No. 16/189,849, dated Jul. 22, 2020, 3 Pages.
Response to Non-Final Office Action filed on Jul. 28, 2020 for U.S. Appl. No. 16/189,849, dated Apr. 29, 2020, 21 Pages.
Response to Restriction Requirement filed on Sep. 28, 2020 for U.S. Appl. No. 16/189,817, dated Sep. 22, 2020, 7 pages.
Restriction Requirement Received for U.S. Appl. No. 16/189,817, dated Sep. 22, 2020, 8 pages.

(56) References Cited

OTHER PUBLICATIONS

Final Office Action Received for U.S. Appl. No. 16/189,849, dated Sep. 16, 2020, 57 Pages.
Applicant Initiated Interview summary received for U.S. Appl. No. 16/189,674 dated Nov. 2, 2020, 3 pages.
Response to Non-Final Office Action filed on Oct. 28, 2020 for U.S. Appl. No. 16/189,674, dated Aug. 18, 2020, 11 pages.
Non Final Office Action Received for U.S. Appl. No. 16/189,817, dated Nov. 6, 2020, 24 Pages.

* cited by examiner

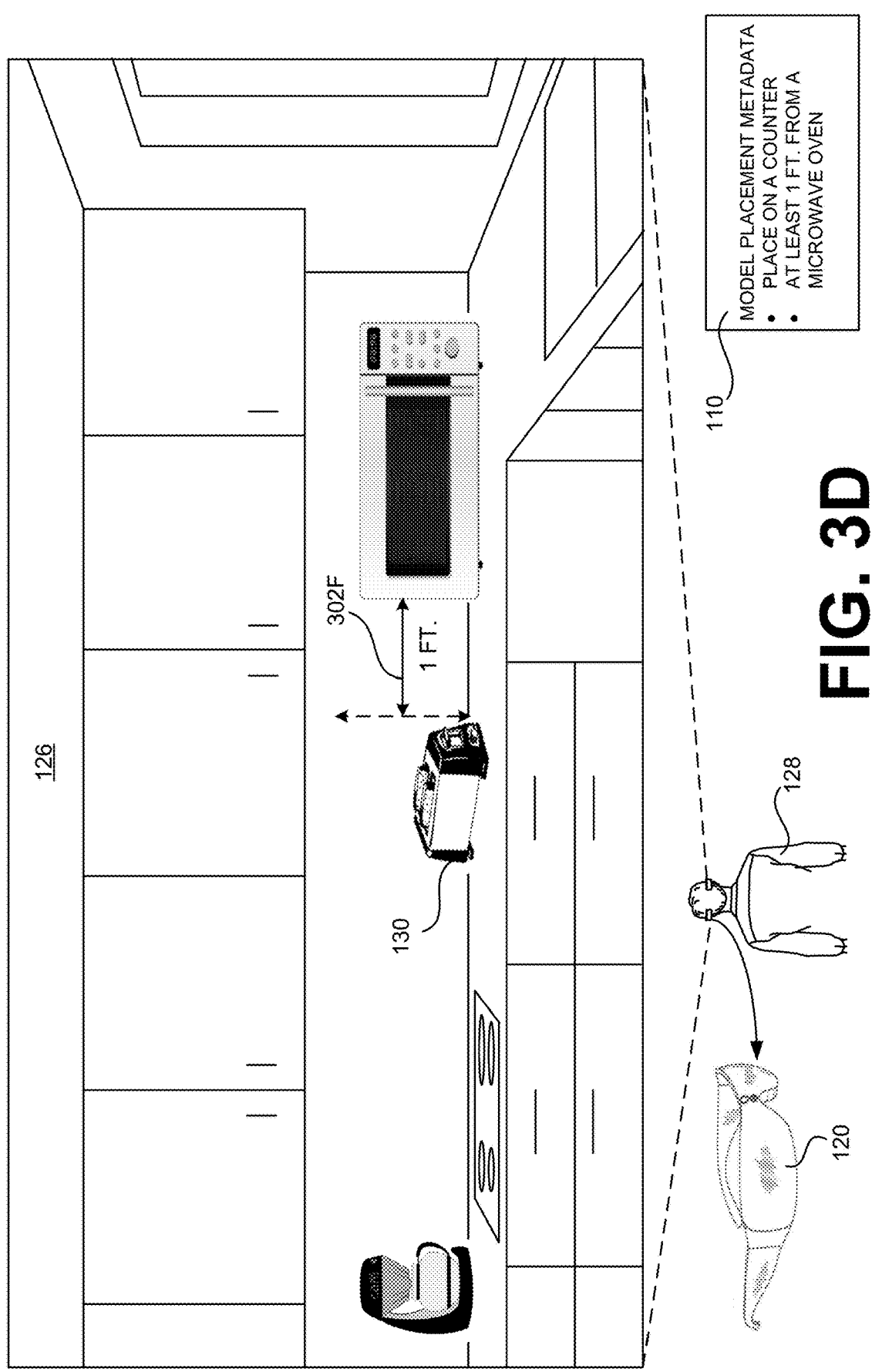

EFFICIENT RENDERING OF 3D MODELS USING MODEL PLACEMENT METADATA

CROSS-REFERENCE TO RELATED APPLICATIONS

This application claims the benefit of and priority to U.S. Provisional Application No. 62/588,189, filed Nov. 17, 2017 and entitled "Augmented Reality, Mixed Reality, and Virtual Reality Experiences," the entire contents of which are incorporated herein by reference.

BACKGROUND

Rendering three-dimensional ("3D") models in augmented reality ("AR") and virtual reality ("VR") environments can present technical challenges. For example, in some scenarios, a user may want to view the same 3D model in multiple different AR or VR environments such as, for instance, different rooms in a home or office. In such scenarios, some existing systems can render 3D models at inappropriate locations within an AR or VR environment. For example, a table or chair might be rendered in mid-air rather than on the ground. Or the table or chair may be rendered at a location that conflicts with a real-world object.

Users can become confused or disoriented when viewing 3D models that have been rendered at inappropriate locations in AR or VR environments. This might, in turn, result in inadvertent or incorrect user input to the computing device rendering the environment. Moreover, the VR or AR environment might need to be re-rendered in order to render a 3D model at a proper location. Inadvertent user input and re-rendering 3D models and environments can unnecessarily utilize computing resources such as processing cycles, memory, and network bandwidth.

In order to render the same 3D model at proper locations in different AR and VR environments, some previous solutions store data specifically defining the location, orientation, and scale of 3D models for each environment in which they will be rendered. However, storing data defining the exact placement of 3D models in many different AR or VR environments in this manner can consume large amounts of storage space.

It is with respect to these and other technical challenges that the disclosure made herein is presented.

SUMMARY

In order to address the technical problems described briefly above, and potentially others, the disclosed technologies can efficiently render 3D models using model placement metadata. Through implementations of the disclosed technologies, 3D models can be rendered at appropriate locations within different AR or VR environments without storing data specifically defining the locations of the 3D models within each of the environments. This can reduce or eliminate inadvertent or inappropriate user input, reduce the need to re-render 3D models and environments, and reduce the amount of storage space required as compared to previous solutions. In this way, the disclosed technologies tangibly improve computing efficiencies with respect to a wide variety of computing resources that would otherwise be consumed and/or utilized by improving human-computer interaction and by reducing the amount of processing cycles and storage required by previous solutions. Technical benefits other than those specifically identified herein might also be realized through implementations of the disclosed technologies.

In one illustrative example, a 3D model (which might be referred to herein simply as a "model") of a real-world item is generated. Model placement metadata is also defined for the 3D model that specifies constraints on the presentation of the 3D model when rendered in a view of a real-world environment, such as a view of a real-world environment generated by an AR or VR device. The metadata can indicate that the constraints must be met in order to render a 3D model. Alternately, the metadata can specify that the constraints are preferred, but not required, in order to render a model.

The model placement metadata might include data specifying constraints on how a 3D model is to be rendered in a view of a real-world environment relative to a type of real-world item in the environment. For example, and without limitation, the model placement metadata might indicate that a 3D model of a flat-screen television is to be rendered on a wall in an environment at a location that is more than two feet away from any other wall hangings in the environment. The model placement metadata might also indicate that the 3D model of the flat-screen television is to be rendered on a wall in the environment at a location that is more than three feet away from 3D models of furniture in an environment, such as a bookcase.

The model placement metadata might also, or alternately, include data specifying constraints indicating that a 3D model is to be rendered in a view of a real-world environment at a location outside a threshold distance of a geometric boundary of the environment. For example, and without limitation, the model placement metadata might indicate that a 3D model of a flat-screen television is to be rendered on a wall in an environment at a location that is more than a specified number of feet away from a ceiling and more than a specified number of feet away from a floor of the environment.

The model placement metadata might also, or alternately, include data specifying constraints indicating that a 3D model is to be rendered in the view of a real-world environment at a location within a threshold distance of a geometric boundary of the environment. For example, and without limitation, the model placement metadata might indicate that a 3D model of a bookcase is to be rendered at a location in an environment that is within a specified number of inches of a wall.

The model placement metadata might also, or alternately, include data specifying constraints indicating that a 3D model is to be rendered in a view of a real-world environment at a location outside a threshold distance of a specific type of real-world item in the environment. For example, and without limitation, the model placement metadata might indicate that a 3D model of a toaster is to be rendered on a countertop in an environment at a location that is more than a specified number of feet away from a rendering of a microwave oven on the countertop. The model placement metadata can define other types of constraints on the placement of 3D models in other configurations.

As discussed briefly above, aspects of the technologies disclosed herein can be implemented by a wearable computing device, such as an AR or VR device. For example, a user of such a device might provide input to the device indicating an interest to add a new real-world item to an environment. As an example, the user might indicate an interest in adding a new flat-screen television to a real-world environment, such as a room in their home. Responsive to receiving such an indication, the wearable device might compute the geometry of the environment and the geometry of real-world items located in the environment. For example, and without limitation, the wearable device might be configured to capture image data of the real-world environment and to compute the geometry based upon the captured data.

The wearable device can also retrieve a 3D model of the new real-world item such as, for example, from a network accessible data store. The wearable device can then analyze the geometry of the environment and the real-world items located therein to determine a configuration for the 3D model that satisfies the constraints set forth by the model placement metadata when the model is rendered in a view of the environment. The configuration might define, for instance, the scale, location, and orientation of the 3D model when rendered in the view of the environment. Once the configuration for the 3D model has been computed, the wearable device can display a rendering of the 3D model according to the determined configuration.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3D illustrates the rendering of another illustrative 3D model in a view of another illustrative real-world environment using other illustrative model placement metadata.

DETAILED DESCRIPTION

Figure 1A:
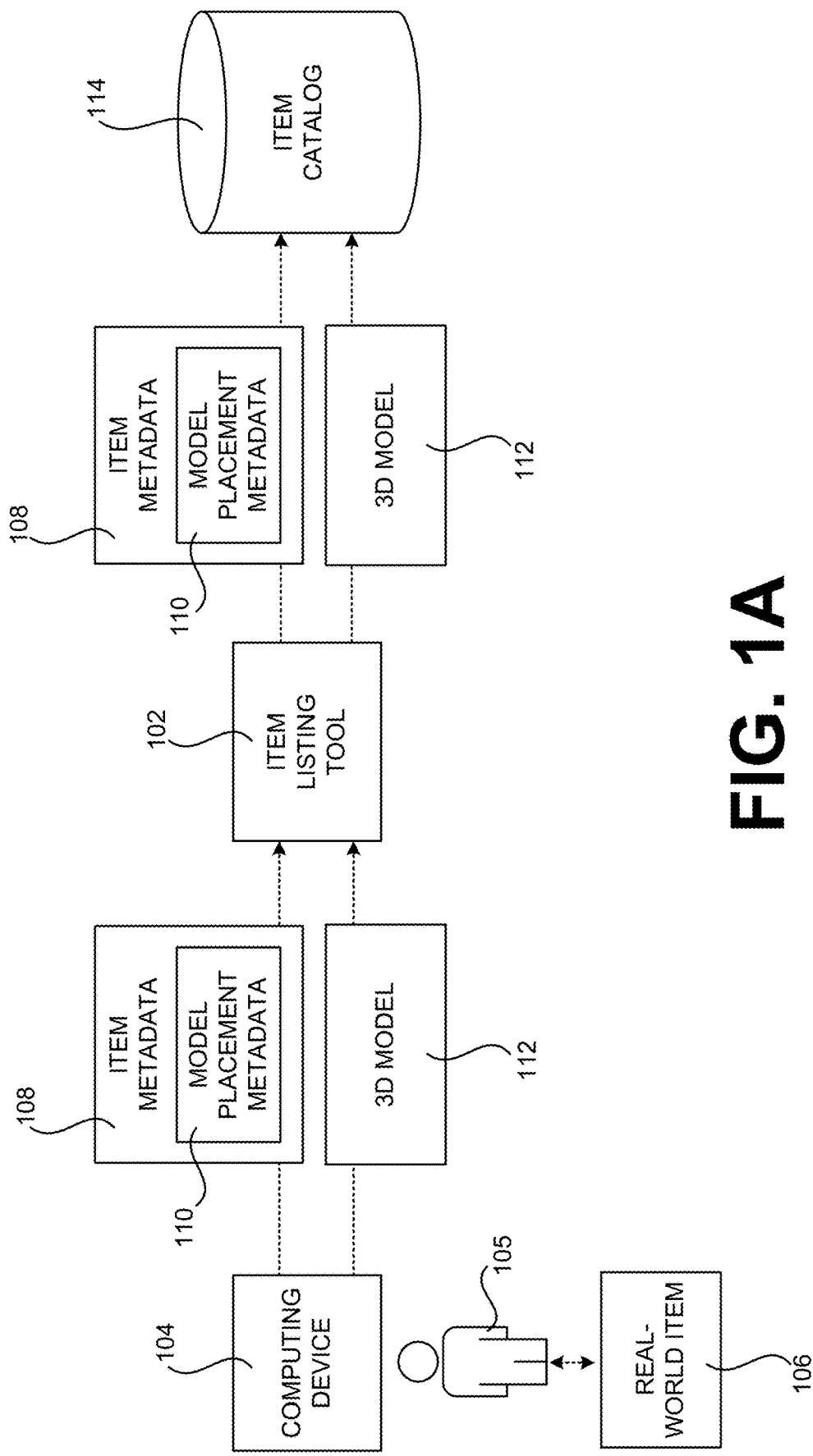
FIG. 1A illustrates aspects of an exemplary system for efficiently rendering 3D models using model placement metadata.

This Detailed Description describes technologies for efficiently rendering 3D models using model placement metadata. As discussed briefly above, the disclosed technologies improve efficiencies with respect to a variety of computing resources. For example, the disclosed technologies reduce the utilization of processor cycles by eliminating the need to re-render 3D models that have been rendered in inappropriate locations or orientations. The disclosed technologies can also reduce the utilization of processor cycles by rendering 3D models in correct locations and orientations, thereby improving human-computer interaction as compared to solutions that might render 3D models inappropriately.

The disclosed technologies also reduce the utilization of data storage resources by storing model placement metadata that can be used to render a 3D model in many environments rather than individually storing data that specifically defines the placement of the 3D model for each different environment. Thus, the disclosed technologies tangibly and measurably improve computing efficiencies with respect to a wide variety of computing resources that would otherwise be consumed and/or utilized using previous solutions. Other technical benefits not specifically identified herein might also be realized through implementations of the disclosed technologies.

As described briefly above, and in greater detail below, a user such as a seller of a real-world item can obtain or define a 3D model of the real-world item. The user can also obtain or define model placement metadata for the 3D model that specifies constraints on the presentation of the 3D model when rendered in a view of a real-world environment, such as a view of a real-world environment generated by an AR or VR device. The metadata can indicate that the constraints must be met in order to render the 3D model. Alternately, the metadata can specify that the constraints are preferred, but not required, in order to render the 3D model.

In one specific example, a seller of a real-world item can specify the 3D model and model placement metadata for a real-world item when listing the item for sale on an electronic marketplace. The 3D model and model placement metadata can be stored in an item catalog for use in presenting the 3D model to buyers browsing the item catalog using a wearable device, such as an AR or VR device. For example, a seller of a real-world item (e.g. a flat-screen television) might define model placement metadata that includes data specifying constraints on how a 3D model of the flat-screen television is to be rendered in a view of a real-world environment relative to a type of real-world item in the environment. The model placement metadata might indicate, for instance, that the 3D model of the flat-screen television is to be rendered on a wall of an environment at a location that is more than two feet away from any 3D models of wall hangings in the environment and more than three feet away from 3D models of furniture in the environment, such as a bookcase.

A seller of a real-world item might also, or alternately, define model placement metadata specifying constraints indicating that a 3D model is to be rendered in a view of a real-world environment at a location outside a threshold distance of a geometric boundary of the environment. For example, and without limitation, the model placement metadata might indicate that a 3D model of a flat-screen television is to be rendered on a wall in an environment at a location that is more than two feet away from a ceiling and more than four feet away from a floor of the environment.

A seller of a real-world item might also, or alternately, define model placement metadata specifying constraints indicating that a 3D model is to be rendered in a view of a real-world environment at a location within a threshold distance of a geometric boundary of the environment. For example, and without limitation, the model placement metadata might indicate that a 3D model of a bookcase is to be rendered at a location in an environment that is within 18 inches of a wall.

A seller of a real-world item might also, or alternately, define model placement metadata specifying constraints indicating that a 3D model is to be rendered in a view of a real-world environment at a location outside a threshold distance of a specific type of real-world item in the environment. For example, and without limitation, the model placement metadata might indicate that a 3D model of a toaster is to be rendered on a countertop in an environment at a location that is more than one foot away from a rendering of a 3D model of a microwave oven on the countertop. The model placement metadata can define other types of constraints on the placement of 3D models in other configurations.

Accordingly, in these examples, when a seller of a real-world item submits an item for inclusion in an item catalog, the seller provides input (i.e. the model placement metadata) that can be used to render a 3D model of an item in many different environments. This helps ensure that the 3D model of the item is rendered and presented to other users (e.g. potential purchasers of the real-world item) in the correct context. Additional details regarding one mechanism for defining the model placement metadata and submitting the model placement metadata for inclusion in an item catalog will be provided below with regard to FIGS. 1A and 2.

As also discussed briefly above and in further detail below, a user of a wearable computing device, such as an AR or VR device, can utilize the device to browse items represented in the item catalog. A user of such a device might also provide input to the device indicating an interest to add a new real-world item to an environment. As an example, the user might indicate an interest in purchasing a flat-screen television and adding the flat-screen television to a real-world environment, such as a room in their home.

Prior to or responsive to receiving such an indication, the wearable device might compute the geometry of the real-world environment and the geometry of any real-world items located in the environment. For example, and without limitation, the wearable device might be configured to capture image data of the room in which the user is located and to compute the geometry of the room based upon the captured data.

The wearable device can also retrieve a 3D model of the new real-world item such as, for example, from the item catalog. The wearable device can then analyze the geometry of the environment and the real-world items located therein to determine a configuration for the 3D model that satisfies the constraints set forth by the model placement metadata when the model is rendered in a view of the environment. The configuration might define, for instance, the scale, location, and orientation of the 3D model when rendered in the view of the environment.

Once the configuration for the 3D model has been computed, the wearable device can display a rendering of the 3D model according to the determined configuration. In this example, for instance, the wearable device can render the 3D model of the flat-screen television in the determined configuration in conjunction with a rendering or view of the user's real-world environment (e.g. the room in which the user of the wearable device is located). Additional details regarding the configuration and operation of such a wearable device will be provided below with regard to FIG. 1B and FIGS. 3A-5.

Referring now to the FIGS., technologies for efficiently rendering 3D models using model placement metadata will be described. In particular, FIG. 1A illustrates aspects of an exemplary system for efficiently rendering 3D models using model placement metadata. As illustrated, the exemplary system includes an item listing tool 102 through which a user 105 of an e-commerce site (not shown in FIG. 1A) can list a real-world item 106 for purchase. The real-world item 106 can be any type of item including, but not limited to, electronics, home goods, automobiles or automotive parts, musical instruments, clothing, and jewelry.

In one configuration, the user 105 can utilize a computing device 104 to access the item listing tool 102. The computing device 104 can be, but is not limited to, a smartphone, a desktop or laptop computer, a tablet computing device, or a wearable computing device such as that described in detail below.

In some configurations, the item listing tool 102 is implemented as a software component that is executed on one or more server computers (not shown in FIG. 1A) operating in conjunction with an e-commerce site. As illustrated, the user 105 can utilize the computing device 104 to establish a connection to the item listing tool 102. Once a connection has been established, the user 105 can define or provide item metadata 108 for the real-world item 106. As will be described in detail below with regard to FIG. 2, the item metadata 108 can include data associated with the real-world item 106 including, but not limited to, a name and description of the real-world item 106, a price for the real-world item 106, and a category on the e-commerce site in which a listing for the real-world item 106 is to be placed. The item metadata 108 can include other types of data, some of which are described below with regard to FIG. 2.

The item metadata 108 also includes model placement metadata 110 in some configurations. As described briefly above, the model placement metadata 110 specifies constraints on the presentation of a 3D model 112 of the real-world item 106 when the 3D model 112 is rendered in a view of a real-world environment, such as a view of a real-world environment generated by an AR or VR device. The model placement metadata 110 can indicate that the constraints must be met in order to render the 3D model 112. Alternately, the model placement metadata 110 might alternately specify that the constraints are preferred, but not required, in order to render the 3D model 112. Details regarding an illustrative data structure for storing the model placement metadata 110 are provided below with respect to FIG. 2.

As discussed briefly above, the model placement metadata 110 might include data specifying constraints on how the 3D model 112 is to be rendered in a view of a real-world environment relative to a type of real-world item in the environment. For example, and without limitation, the model placement metadata 110 might indicate that a 3D model 112 of a flat-screen television is to be rendered on a wall in an environment at a location that is more than two feet away from any other wall hangings in the environment. The model placement metadata 110 might also indicate that the 3D model 112 of the flat-screen television is to be rendered on a wall in the environment at a location that is more than three feet away from 3D models of furniture in an environment, such as a bookcase. Additional details regarding this example will be provided below with respect to FIG. 3A.

The model placement metadata 110 might also, or alternately, include data specifying constraints indicating that the 3D model 112 is to be rendered in a view of a real-world environment at a location outside a threshold distance of a geometric boundary of the environment. For example, and without limitation, the model placement metadata 112 might indicate that a 3D model 112 of a flat-screen television is to be rendered on a wall in an environment at a location that is more than two feet away from a ceiling and more than four feet away from a floor of the environment. Additional details regarding this example will be provided below with respect to FIG. 3B.

The model placement metadata 110 might also, or alternately, include data specifying constraints indicating that the 3D model 112 is to be rendered in a view of a real-world environment at a location within a threshold distance of a geometric boundary of the environment. For example, and without limitation, the model placement metadata 110 might indicate that a 3D model 112 of a bookcase is to be rendered at a location in an environment that is within 18 inches of a wall. Additional details regarding this example will be provided below with respect to FIG. 3C.

The model placement metadata 110 might also, or alternately, include data specifying constraints indicating that the 3D model 112 is to be rendered in a view of a real-world environment at a location outside a threshold distance of a specific type of real-world item in the environment. For example, and without limitation, the model placement metadata 112 might indicate that a 3D model 112 of a toaster is to be rendered on a countertop in an environment at a location that is more than one foot away from a rendering of a microwave oven on the countertop. Additional details regarding this example will be provided below with respect to FIG. 3D.

It is to be appreciated that the model placement metadata 110 can define other types of constraints on the placement of 3D models 112 in other configurations. It is also to be appreciated that the item listing tool 102 can provide a user interface ("UI"), application programming interface ("API"), or another type of interface through which a user 105 can supply or define the item metadata 108, the model placement metadata 110, and the 3D model 112 for a real-world item 106.

It is to be further appreciated that the item listing tool 102 can store the item metadata 108, the model placement metadata 110, and the 3D model 112 in an item catalog 114 or another type of data store. As will be described in greater detail with regard to FIG. 1B, the item metadata 108, the model placement metadata 110, and the 3D model 112 can be retrieved from the item catalog 114 in order to present a view of an environment that includes a rendering of the 3D model 112 to a user of a computing device such as, for example, an AR or VR device.

Figure 1B:
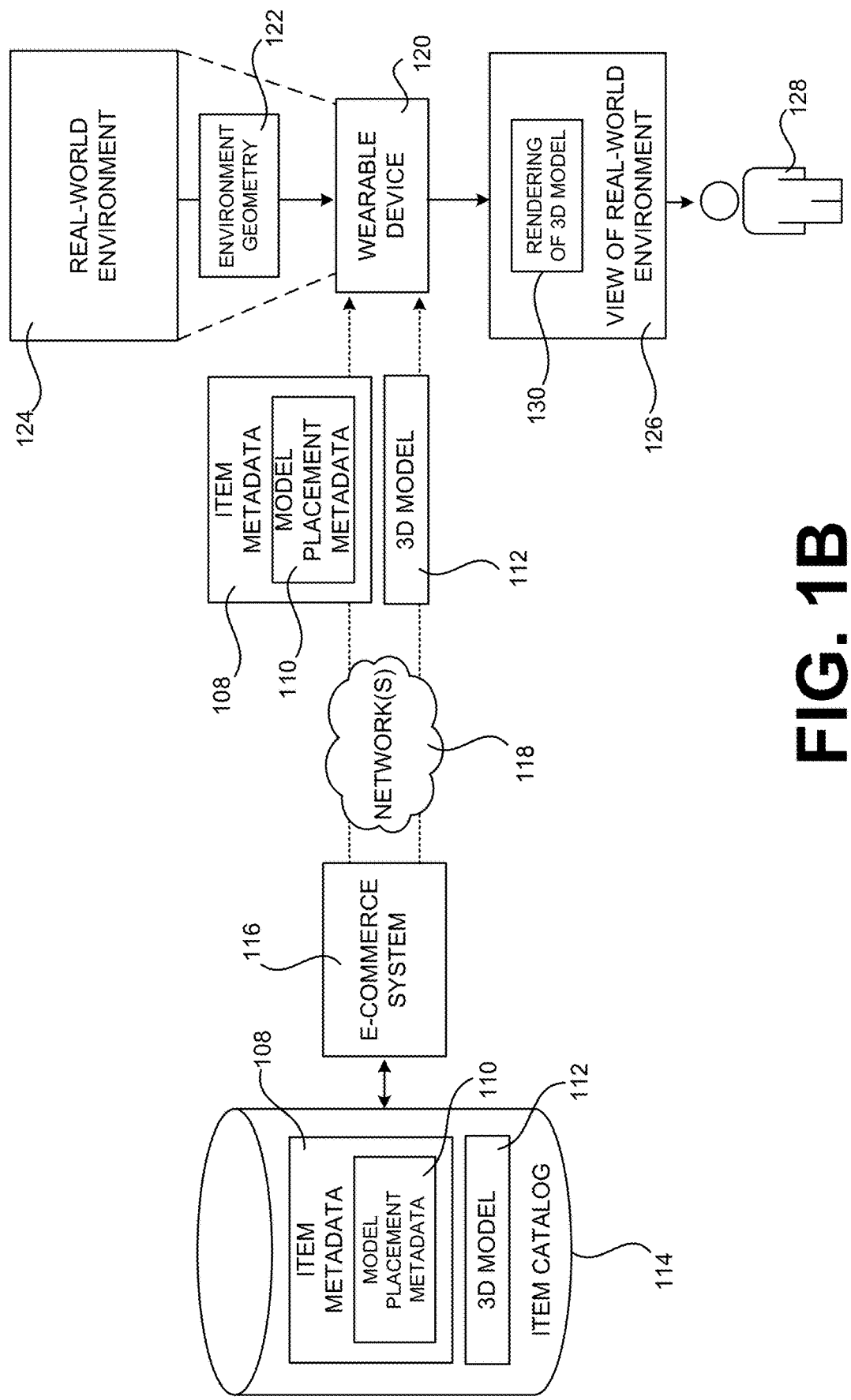
FIG. 1B illustrates additional aspects of the system shown in FIG. 1A for efficiently rendering 3D models using model placement metadata.

Turning now to FIG. 1B, additional aspects of the system shown in FIG. 1A for efficiently rendering 3D models 112 using model placement metadata 110 will be described. As shown in FIG. 1B, a wearable device 120 can be configured to use network communications to interact with an electronic commerce ("e-commerce") system 116. The e-commerce system 116 provides an online marketplace through which items, such as the real-world item 106, can be bought and/or sold by registered users and/or merchants.

In order to provide its functionality, the e-commerce system 116 can utilize various computing resources to collect and store information (e.g. the item metadata 108 and the 3D model 112 for the real-world item 106) related to items for sale, to cause the information related to the items to be displayed to a potential buyer, to conduct online auctions of real-world items 106, to match a buyer of an item with a seller of the item, to process a transaction, etc. In the examples shown in FIGS. 1A and 1B, for instance, the user 105 has listed the real-world item 106 for sale on the online marketplace, and the user 128 is interested in purchasing the real-world item 106 from the user 105.

As also discussed briefly above and in further detail below, a user 128 of a wearable computing device 120, such as an AR or VR device, can utilize the device 120 to browse items represented in the item catalog 114. The wearable device 120 might be, for example, an AR device. An AR device is a computing device capable of providing a view of a real-world environment 124 within which physical objects in the real-world environment 124 are augmented or supplemented by computer-generated ("CG") sensory input (e.g., sound, video, graphics, etc.). For instance, an AR device might provide a view 126 of the real-world environment 124 with a rendering 130 of a 3D model 112 overlaid on the view 126 such that the rendering 130 of the 3D model 112 appears to be present in the real-world environment 124. Additional details regarding the configuration and operation of a wearable device 120 capable of providing this functionality is provided below with regard to FIG. 5.

The wearable device 120 might also be a VR computing device. A VR computing device can replicate an environment, real or imagined, and simulate a user's physical presence in that environment in a way that allows the user to interact with the environment. For instance, a VR computing device can render a view of an environment, such as a room in which a user of the VR device is present. The VR computing device can also render a 3D model 112 in the environment in the manner described herein. In this regard, it is to be appreciated that the rendering of a 3D model 112 by the wearable device 120 includes displaying a representation of a real-world item 106 in AR and VR environments as well as other types of environments, such as mixed reality ("MR") environments. It is also to be appreciated that the configurations disclosed herein are not limited to use with an AR or VR device. Rather, the technologies disclosed herein can be utilized with any type of computing device that can provide a view 126 of a real-world environment 124 that includes a rendering 130 of a 3D model 112.

It is to be further appreciated that the technologies described herein can be implemented on a variety of different types of wearable devices 120 configured with a variety of different operating systems, hardware components, and/or installed applications. In various configurations, for example, the wearable device 108 can be implemented by the following example wearable devices: GOOGLE GLASS, MAGIC LEAP ONE, MICROSOFT HOLOLENS, META 2, SONY SMART EYEGLASS, HTC VIVE, OCULUS GO, PLAYSTATION VR, or WINDOWS mixed reality headsets. Thus, embodiments of the present disclosure can be implemented in any AR-capable device, which is different than goggles or glasses that obstruct a user's view of real-world objects, e.g., actual reality. The techniques described herein are device and/or operating system agnostic.

While browsing listings for items represented in the item catalog 114, a user 128 of the wearable device 120 might provide user input to the device 120 indicating an interest to add a new real-world item, such as the real-world item 106, to their real-world environment 124. As an example, the user 128 might indicate an interest in purchasing a flat-screen television and adding the flat-screen television to a real-world environment 124, such as a room in the user's home.

Prior to or responsive to receiving such an indication from the user 128, the wearable device 120 might compute the geometry 122 of the real-world environment 124 and the geometry of any real-world items located in the environment 124. For example, and without limitation, the wearable device 120 might be configured with hardware capable of capturing images of the real-world environment 124 in which the user 128 is located, and to compute the geometry 122 of the environment 124 and any objects contained therein based upon the captured data. Details regarding a wearable device 120 configured with hardware capable of providing this functionality are provided below with regard to FIG. 5.

As shown in FIG. 1B, the wearable device 120 can also retrieve the item metadata 108, including the model placement metadata 110, for the new real-world item 106 that the user 128 has expressed an interest in from the item catalog 114. The wearable device 120 can also retrieve the 3D model 112 of the new real-world item 106 that the user 128 has expressed an interest in from the item catalog 114. The wearable device 120 can retrieve the 3D model 112 and the item metadata 108 from the e-commerce system 116 by establishing a connection to the e-commerce system by way of one or more networks 118.

Once the wearable device 120 has obtained the item metadata 108 and the 3D model 112 for the real-world item 106, the wearable device 120 can analyze the geometry 122 of the real-world environment 124 and the real-world items located therein to determine a configuration for the 3D model 112 that satisfies the constraints set forth by the model placement metadata 110 when the 3D model 112 is rendered in a view 126 of the environment 124. The configuration might define, for instance, the scale, location, and orientation of the 3D model 112 when rendered in the view 126 of the environment 124.

Once the configuration for the 3D model 112 has been computed, the wearable device 120 can display a rendering 130 of the 3D model 112 according to the determined configuration. In this example, for instance, the wearable device 120 can render the 3D model 112 of the flat-screen television in the determined configuration in conjunction with a rendering or view 126 of the user's real-world environment 124 (e.g. the room in which the user 128 of the wearable device 120 is located). Additional details regarding this process will be provided below with regard to FIGS. 3A-4.

Figure 2:
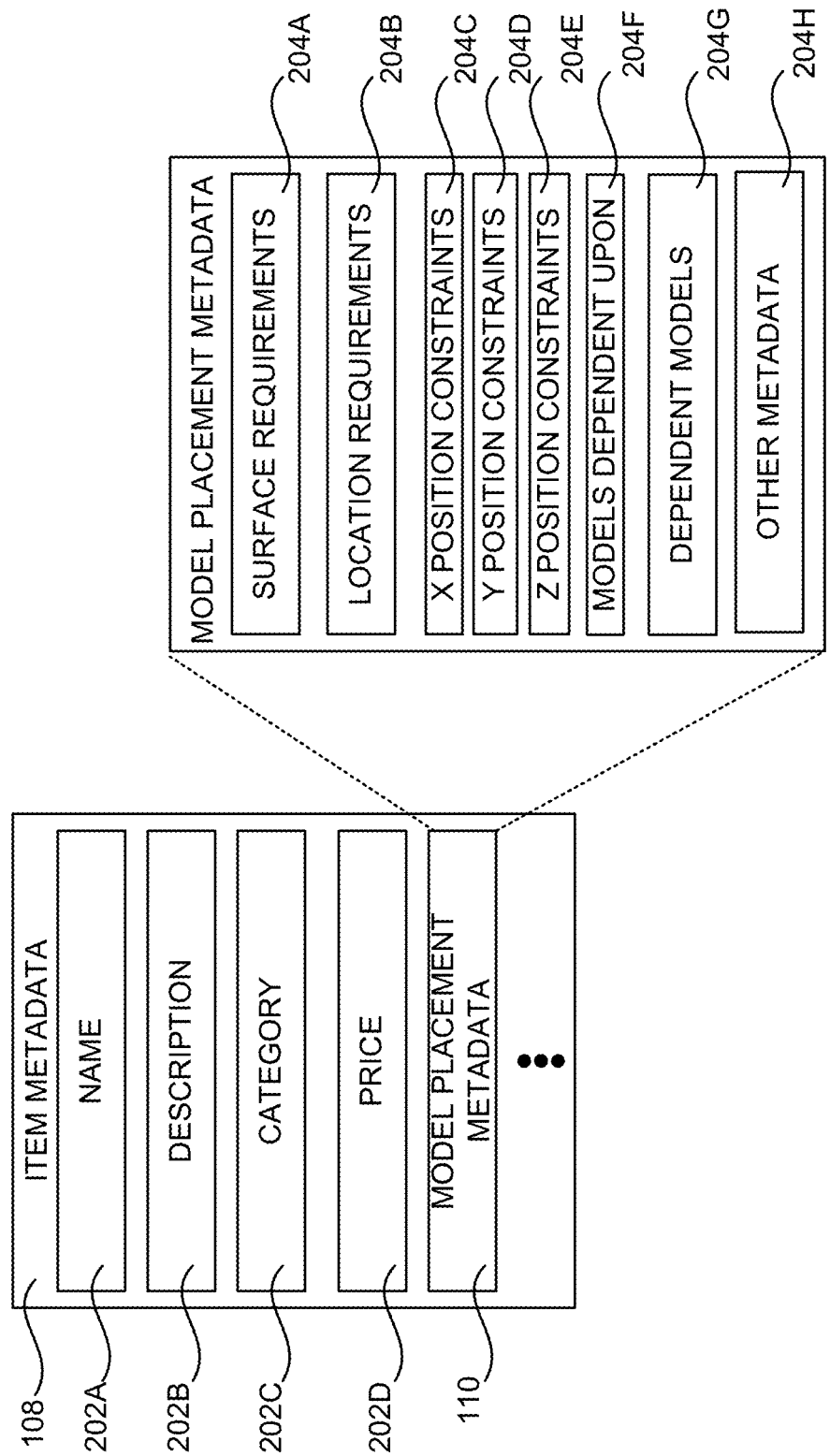
FIG. 2 illustrates the format and contents of an exemplary item metadata data structure and a model placement metadata data structure.

FIG. 2 illustrates the format and contents of an exemplary item metadata 108 data structure and a model placement metadata 110 data structure. As described briefly above and illustrated in FIG. 2, the item metadata 108 can include various types of data relating to a real-world item 106 that is listed for sale on the online marketplace described above. In this regard, it is to be appreciated that the model placement metadata 110 shown in FIG. 2 and described below is merely illustrative and that other types of constraints on the configuration of a 3D model in a view 126 of an environment might be defined and used in a similar fashion to that described herein.

In one configuration, the item metadata 108 includes a field 208A specifying a name for the real-world item 106, a field 202B containing a text description of the real-world item 106, a field 202C specifying a product category for the real-world item 106, and a field 202D including a price for the real-world item 106. The item metadata 108 can include other types of data in other configurations.

The item metadata 108 can also include the model placement metadata 110. As discussed above, the model placement metadata 110 comprises data specifying constraints on the presentation of a 3D model 112 for a real-world item 106 when rendered in a view 126 of a real-world environment, 124 such as a view 126 of a real-world environment 124 generated by an AR or VR device. For instance, in one particular configuration, the model placement metadata 110 can include a field 204A defining surface requirements for a rendering of the 3D model 112. The surface requirements set forth in field 204A might indicate that the 3D model 112 is to be rendered on a particular surface in a view 126 of an environment such as, but not limited to, a floor, a wall, a ceiling, the ground, a countertop, or a table.

The model placement metadata 110 can also, or alternately, include a field 204B defining location requirements for a rendering of the 3D model 112. The location requirements set forth in field 204B might indicate, for example, that the 3D model 112 is to be rendered outdoors or in a room having a minimum size, maximum size, or specific size. The location requirements can identify other types of locations in a view 126 of an environment that are permissible or required for rendering of the 3D model 112 to occur.

The model placement metadata 110 can also, or alternately, include fields 204C-204E defining X, Y, and Z position constraints, respectively, for a rendering of the 3D model 112. The position constraints set forth in fields 204C-204E might indicate, for example, that the 3D model 112 is to be rendered at least five feet above a floor in a view 126 of an environment, at least two feet below a ceiling in a view 126 of an environment, and more than 18 inches from a wall of in the view 126 of the environment. The X, Y, and Z position constraints defined in fields 204C-204E can set forth constraints on the position of the rendering of the 3D model 112 in a view 126 of an environment in other ways in other configurations.

The model placement metadata 110 can also, or alternately, include a field 204G identifying other 3D models upon which the 3D model 112 is dependent and a field 204H identifying other 3D models that depend upon the 3D model 112. Dependent 3D models are models that are to be rendered together. For example, and without limitation, the 3D model 112 might be of a plate. In this example, the 3D model 112 might be dependent upon other 3D models defining other items or china or silverware. The other 3D models might also depend upon the 3D model 112 of the plate. The fields 204G and 204H might include data indicating that none of the dependent 3D models are to be rendered if the constraints for rendering one of the 3D models cannot be satisfied. The model placement metadata 110 can include other metadata 204H, some examples of which are described below.

Figure 3A:
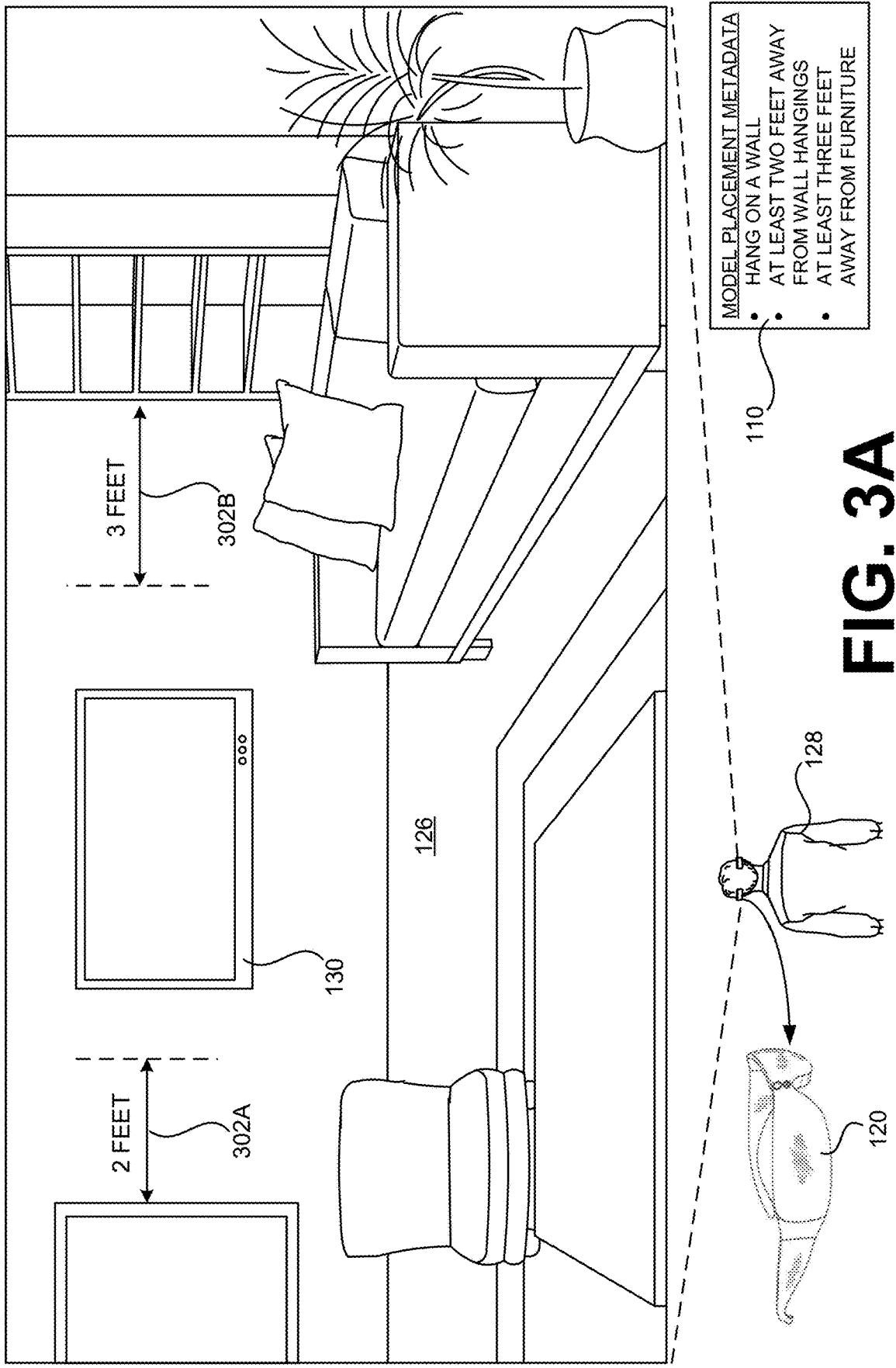
FIG. 3A illustrates the rendering of an illustrative 3D model in a view of an illustrative real-world environment using illustrative model placement metadata.

FIG. 3A illustrates the rendering of an illustrative 3D model 112 in a view 126 of an illustrative real-world environment 125 using illustrative model placement metadata 110. In the example environment 126 shown in FIG. 3A, a user 128 is looking into a living room of her home while wearing a wearable device 120. As discussed above, the view 126 provided via the wearable device 120 comprises a view of the real-world environment 124 from the perspective of the user 128 in some configurations.

As also discussed above, the user 128 may provide input to the wearable device 120, indicating that she is shopping for a new television for the living room. In response, the wearable device 120 is configured to scan the living room to recognize objects and/or determine characteristics (e.g., geometrical boundaries, a size, display locations, etc.) of the living room. The wearable device 120 is configured to then access the item catalog 114 to identify televisions to recommend to the user 128. As part of this process, the wearable device 120 can access item metadata 108 for the items and determine whether a 3D model 112 for a television can be displayed in the view 126 of the real-world environment 124 being viewed by the user 128.

In the example shown in FIG. 3A, a seller of a flat-screen television has defined model placement metadata 110 for a rendering 130 of a 3D model 112 of the flat-screen television requiring that the rendering 130 of the flat-screen television is to be rendered on a wall in the view 126 of the environment at a distance 302A (i.e. two feet) away from any 3D models of wall hangings in the view 126 of the environment and more than a second distance 302B (i.e. three feet) away from 3D models of furniture in the environment, such as the bookcase shown in FIG. 3A.

As described above, the wearable device 120 can analyze the computed geometry of the environment and the real-world items located therein to determine a configuration for the rendering 130 of the 3D model 112 that satisfies the constraints set forth by the model placement metadata 110. The specified constraints can be satisfied in this example by configuring the placement of the rendering 130 of the 3D model 112 in the manner shown in FIG. 3A. The wearable device 120 can, therefore, display a rendering 130 of the 3D model 112 in the view 126 according to the determined configuration.

Figure 3B:
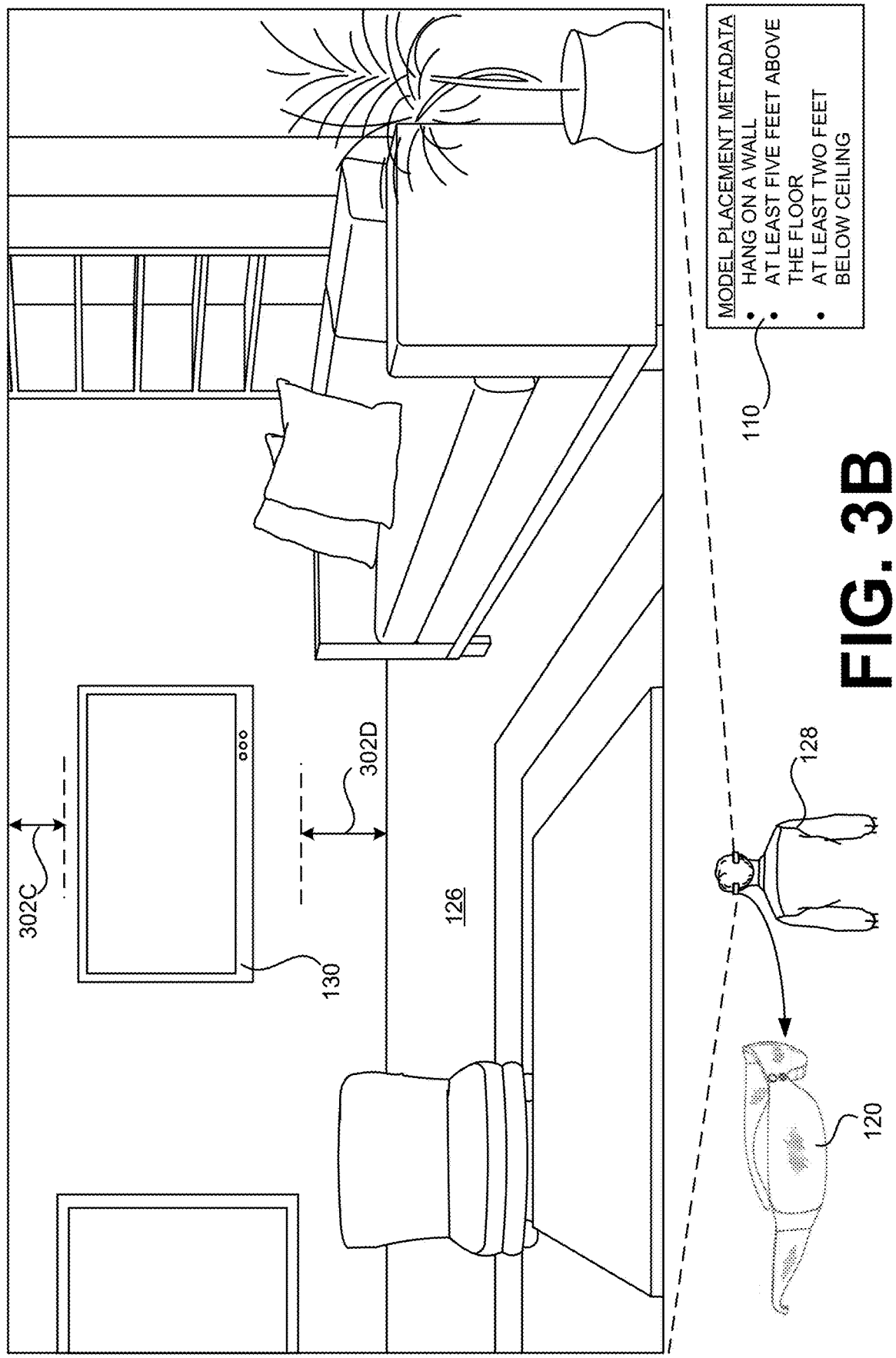
FIG. 3B illustrates the rendering of the illustrative 3D model shown in FIG. 3A in a view of an illustrative real-world environment using other illustrative model placement metadata.

FIG. 3B illustrates the rendering of the illustrative 3D model shown in FIG. 3A in a view 126 of an illustrative real-world environment 124 using other illustrative model placement metadata 110. In this example, the seller of a real-world item 106 has defined model placement metadata 110 indicating that a rendering 130 of a 3D model 112 of a flat-screen television is to be rendered on a wall in a view 126 of an environment at a location that is more than a specified distance (e.g. two feet) away from a ceiling and more than a second specified distance (e.g. four feet) away from a floor of the environment. The specified constraints can also be satisfied in this example and, therefore, the wearable device 120 presents the rendering 130 of the 3D model 112 of the television in the configuration shown in FIG. 3B.

Figure 3C:
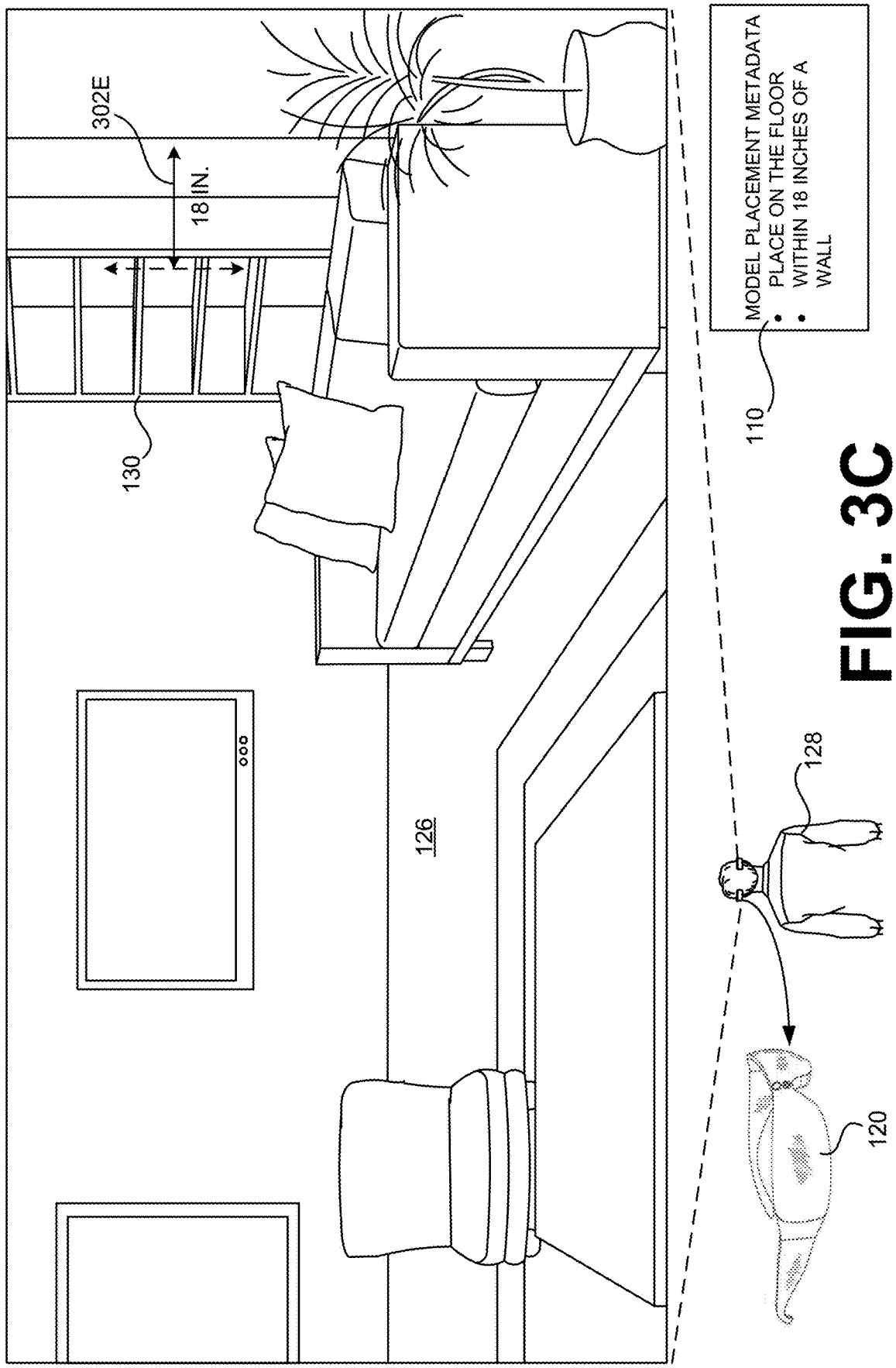
FIG. 3C illustrates the rendering of the illustrative 3D model shown in FIGS. 3A and 3B in a view of an illustrative real-world environment using other illustrative model placement metadata.

FIG. 3C illustrates the rendering of the illustrative 3D model 112 shown in FIGS. 3A and 3B in a view of an illustrative real-world environment 124 using other illustrative model placement metadata 110. In this example, the seller of a real-world item 106 has defined model placement metadata 110 indicating that a rendering 130 of a 3D model 112 of a bookcase is to be rendered on the floor in a view 126 of an environment at a location that is within a specified distance 302E (i.e. 18 inches) from a wall of the environment. The specified constraints can also be satisfied in this example and, therefore, the wearable device 120 presents the rendering 130 of the 3D model 112 of the bookcase in the configuration shown in FIG. 3C.

FIG. 3D illustrates the rendering of another illustrative 3D model 112 in a view of another illustrative real-world environment 124 using other illustrative model placement metadata 110. In this example, the user 128 of the wearable device 120 is viewing their kitchen. The user 128 has also indicated an interest in purchasing a toaster from an online marketplace.

In the example shown in FIG. 3D, a seller of a toaster has defined model placement metadata 110 specifying that a 3D model 112 of a toaster is to be rendered on a horizontal countertop in a view 126 of an environment at a location that is more than a specified distance 302F (i.e. one foot) away from a rendering of a 3D model of a microwave oven on the countertop. As in the examples discussed above, the specified constraints can be satisfied in this example and, therefore, the wearable device 120 presents the rendering 130 of the 3D model 112 of the toaster in the configuration shown in FIG. 3D.

Figure 4:
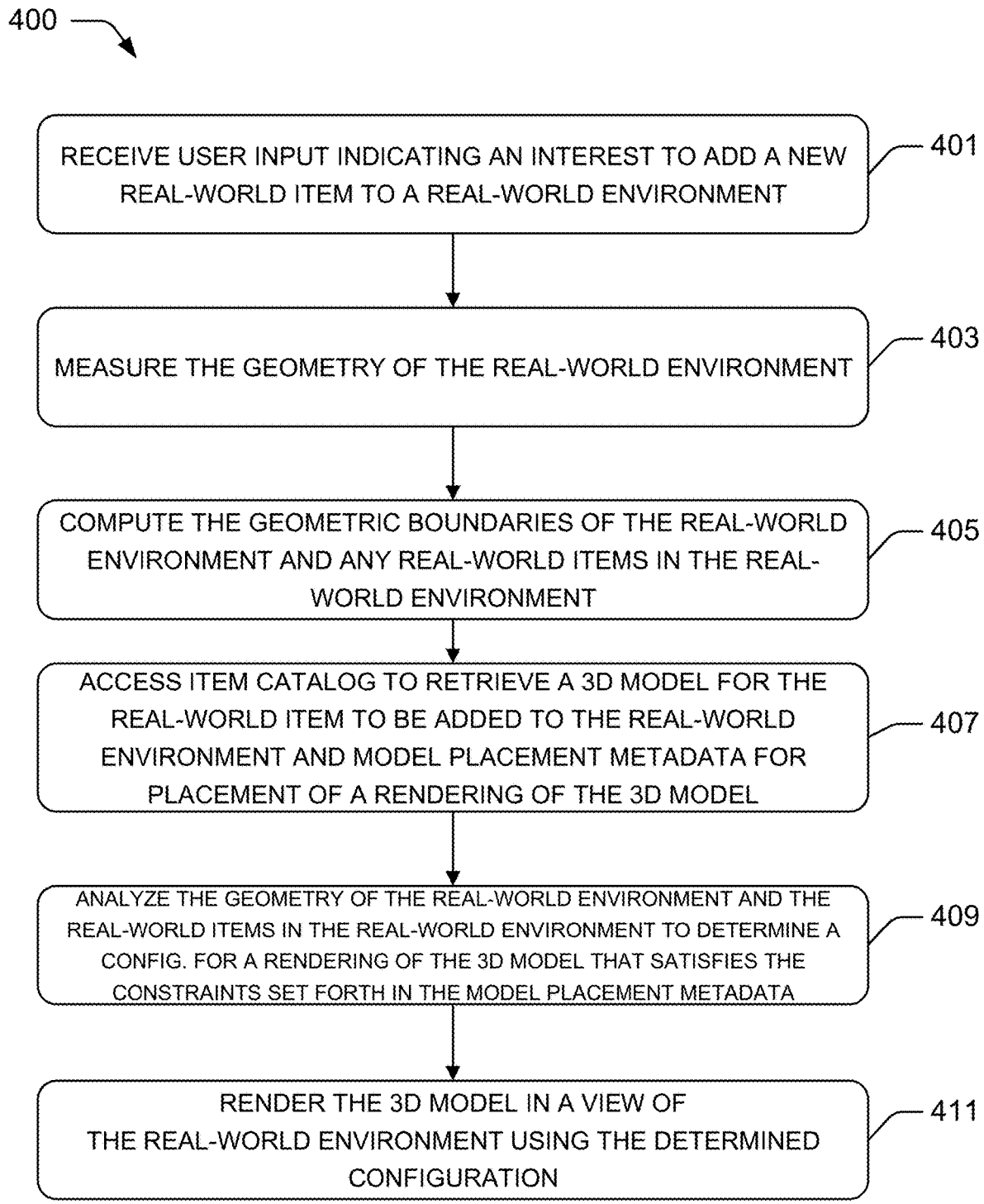
FIG. 4 is a flow diagram that illustrates an example process describing aspects of the technologies disclosed herein for efficient rendering of 3D models using model placement metadata.

FIG. 4 is a flow diagram that illustrates an example process 400 describing aspects of the technologies presented herein with reference to FIGS. 1A-3D for efficient rendering of 3D models 112 using model placement metadata 110. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software (i.e. computer-executable instructions), firmware, in special-purpose digital logic, and any combination thereof. Generally, computer-executable instructions include routines, programs, objects, components, data structures, and the like that perform or implement particular functions It should be appreciated that more or fewer operations can be performed than shown in the figures and described herein. These operations can also be performed in a different order than those described herein. Other processes described throughout this disclosure shall be interpreted accordingly.

The process 400 begins at block 401, where a wearable device 120 receives user input indicating an interest to add a new real-world item 106 to a real-world environment 124, such as those described above. The process 400 then proceeds from block 401 to block 403, where the wearable device 120 measures the geometry of the real-world environment 124. Based upon the measurement, the wearable device 120 computes the geometric boundaries of the real-world environment 124 and any real-world items existing therein at block 405.

At block 407, the wearable device 120 accesses the item catalog 114 to retrieve a 3D model 112 for the real-world item 106 to be added to the real-world environment 124. The wearable device 120 also retrieves the model placement metadata 110 for the real-world item 106 from the item catalog 114.

At block 409, the wearable device 120 analyzes the geometry of the real-world environment 124 and any real-world items contained therein to determine a configuration for a rendering 130 of the 3D model 112 that satisfies the constraints set forth in the model placement metadata 110. If a configuration of the rendering 130 can be identified that satisfies the constraints, then at block 411 the wearable device 120 renders the 3D model 112 in the determined configuration and presents the rendering 130 of the 3D model 112 in the view 126 of the environment.

As discussed briefly above, the model placement metadata 110 can include other metadata 204H in some configurations. The other metadata 204H can enable additional functionality for placing 3D models 112 in an environment. For example, and without limitation, the other metadata 204H might specify instructions for the placement of a 3D model 112 in an environment if a real-world object already exists at a desired location. For instance, a picture might already exist on a wall at a location at which a 3D model 112 of a flat-screen television is to be displayed. In this example, the other metadata 204H might indicate that the 3D model 112 is to be rendered in front of the picture. The other metadata 204H might alternately indicate that a recommendation is to be provided to the user to move the picture in the real-world environment 124 so that an accurate rendering of the 3D model 112 can be made in that location.

The other metadata 204H might also, or alternately, specify instructions for the placement of a 3D model 112 in an environment if there are imperfections in a surface upon which a 3D model 112 is to be rendered. For example, a wall upon which a 3D model 112 of a flat-screen television might not be perfectly planar or might have other types of imperfections. In this example, the other metadata 204H might specify constraints indicating the conditions under which the 3D model is or is not to be rendered. For instance, the other metadata 204H might indicate that the 3D model 112 is to be rendered if the imperfections are less than a threshold value. Similarly, the other metadata 204H might indicate that the 3D model is not to be rendered if the imperfections are greater than a threshold value. The other metadata 204H can define other conditions, thresholds, constraints, and restrictions upon the placement of 3D models 112 in other configurations.

Figure 5:
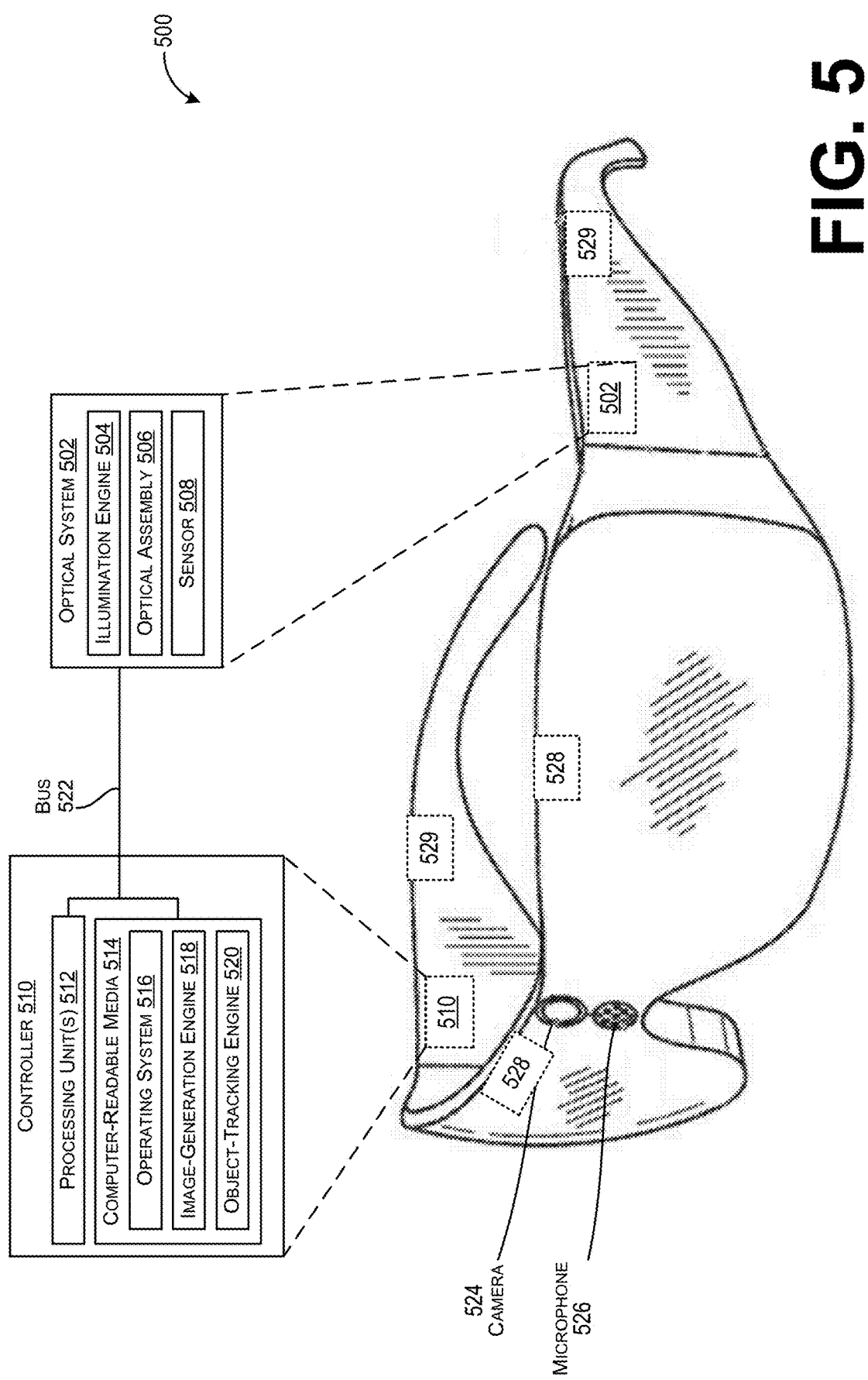
FIG. 5 shows an illustrative configuration of a wearable device capable of implementing aspects of the technologies disclosed herein.

FIG. 5 shows an illustrative configuration of a wearable device 500 (e.g., a headset system, a head-mounted display, etc.) capable of implementing aspects of the technologies disclosed herein. The wearable device 500 includes an optical system 502 with an illumination engine 504 to generate electro-magnetic ("EM") radiation that includes both a first bandwidth for generating computer-generated ("CG") images and a second bandwidth for tracking physical objects. The first bandwidth may include some or all of the visible-light portion of the EM spectrum whereas the second bandwidth may include any portion of the EM spectrum that is suitable to deploy a desired tracking protocol.

In the example configuration, the optical system 502 further includes an optical assembly 506 that is positioned to receive the EM radiation from the illumination engine 504 and to direct the EM radiation (or individual bandwidths of thereof) along one or more predetermined optical paths. For example, the illumination engine 504 may emit the EM radiation into the optical assembly 506 along a common optical path that is shared by both the first bandwidth and the second bandwidth. The optical assembly 506 may also include one or more optical components that are configured to separate the first bandwidth from the second bandwidth (e.g., by causing the first and second bandwidths to propagate along different image-generation and object-tracking optical paths, respectively).

The optical assembly 506 includes components that are configured to direct the EM radiation with respect to one or more components of the optical assembly 506 and, more specifically, to direct the first bandwidth for image-generation purposes and to direct the second bandwidth for object-tracking purposes. In this example, the optical system 502 further includes a sensor 508 to generate object data in response to a reflected-portion of the second bandwidth, i.e. a portion of the second bandwidth that is reflected off an object that exists within a real-world environment.

In various configurations, the wearable device 500 may utilize the optical system 502 to generate a composite view (e.g., from a perspective of a user 128 that is wearing the wearable device 500) that includes both one or more CG images and a view of at least a portion of the real-world environment 124 that includes the object. For example, the optical system 502 may utilize various technologies such as, for example, AR technologies to generate composite views that include CG images superimposed over a real-world view 126. As such, the optical system 502 may be configured to generate CG images via a display panel. The display panel can include separate right eye and left eye transparent display panels.

Alternatively, the display panel can include a single transparent display panel that is viewable with both eyes and/or a single transparent display panel that is viewable by a single eye only. Therefore, it can be appreciated that the technologies described herein may be deployed within a single-eye Near Eye Display ("NED") system (e.g., GOOGLE GLASS) and/or a dual-eye NED system (e.g., OCULUS RIFT). The wearable device 500 is an example device that is used to provide context and illustrate various features and aspects of the user interface display technologies and systems disclosed herein. Other devices and systems, such as VR systems, may also use the interface display technologies and systems disclosed herein.

The display panel may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the wearable device 500 may further include an additional see-through optical component.

In the illustrated example of FIG. 5, a controller 510 is operatively coupled to each of the illumination engine 504, the optical assembly 506 (and/or scanning devices thereof) and the sensor 508. The controller 510 includes one or more logic devices and one or more computer memory devices storing instructions executable by the logic device(s) to deploy functionalities described herein with relation to the optical system 502. The controller 510 can comprise one or more processing units 512, one or more computer-readable media 514 for storing an operating system 516 and data such as, for example, image data that defines one or more CG images and/or tracking data that defines one or more object tracking protocols.

The computer-readable media 514 may further include an image-generation engine 518 that generates output signals to modulate generation of the first bandwidth of EM radiation by the illumination engine 504 and also to control the scanner(s) to direct the first bandwidth within the optical assembly 506. Ultimately, the scanner(s) direct the first bandwidth through a display panel to generate CG images that are perceptible to a user, such as a user interface.

The computer-readable media 514 may further include an object-tracking engine 520 that generates output signals to modulate generation of the second bandwidth of EM radiation by the illumination engine 504 and also the scanner(s) to direct the second bandwidth along an object-tracking optical path to irradiate an object. The object tracking engine 520 communicates with the sensor 508 to receive the object data that is generated based on the reflected-portion of the second bandwidth.

The object tracking engine 520 then analyzes the object data to determine one or more characteristics of the object such as, for example, a depth of the object with respect to the optical system 502, an orientation of the object with respect to the optical system 502, a velocity and/or acceleration of the object with respect to the optical system 502, or any other desired characteristic of the object. The components of the wearable device 500 are operatively connected, for example, via a bus 522, which can include one or more of a system bus, a data bus, an address bus, a PCI bus, a Mini-PCI bus, and any variety of local, peripheral, and/or independent buses.

The wearable device 500 may further include various other components, for example cameras (e.g., camera 524), microphones (e.g., microphone 526), accelerometers, gyroscopes, magnetometers, temperature sensors, touch sensors, biometric sensors, other image sensors, energy-storage components (e.g. battery), a communication facility, a GPS receiver, etc. Furthermore, the wearable device 500 can include one or more eye gaze sensors 528. In at least one example, an eye gaze sensor 528 is user facing and is configured to track the position of at least one eye of a user. Accordingly, eye position data (e.g., determined via use of eye gaze sensor 528), image data (e.g., determined via use of the camera 524), and other data can be processed to identify a gaze path of the user. That is, it can be determined that the user is looking at a particular section of a hardware display surface, a particular real-world object or part of a real-world object in the view of the user, and/or a rendered object or part of a rendered object displayed on a hardware display surface.

In some configurations, the wearable device 500 can include an actuator 529. The processing units 512 can cause the generation of a haptic signal associated with a generated haptic effect to actuator 529, which in turn outputs haptic effects such as vibrotactile haptic effects, electrostatic friction haptic effects, or deformation haptic effects. Actuator 529 includes an actuator drive circuit. The actuator 529 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator.

In alternate configurations, wearable device 500 can include one or more additional actuators 529. The actuator 529 is an example of a haptic output device, where a haptic output device is a device configured to output haptic effects, such as vibrotactile haptic effects, electrostatic friction haptic effects, or deformation haptic effects, in response to a drive signal. In alternate configurations, the actuator 529 can be replaced by some other type of haptic output device. Further, in other alternate configurations, wearable device 500 may not include actuator 529, and a separate device from wearable device 500 includes an actuator, or other haptic output device, that generates the haptic effects, and wearable device 500 sends generated haptic signals to that device through a communication device.

The processing unit(s) 512, can represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 514, can store instructions executable by the processing unit(s) 522. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

In various examples, the wearable device 500 is configured to interact, via network communications, with a network device (e.g., a network server or a cloud server) to implement the configurations described herein. For instance, the wearable device 500 may collect data and send the data over network(s) to the network device. The network device may then implement some of the functionality described herein (e.g., analyze passive signals, determine user interests, select a recommended item, etc.). Subsequently, the network device can cause the wearable device 500 to display an item and/or instruct the wearable device 500 to perform a task.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 6:
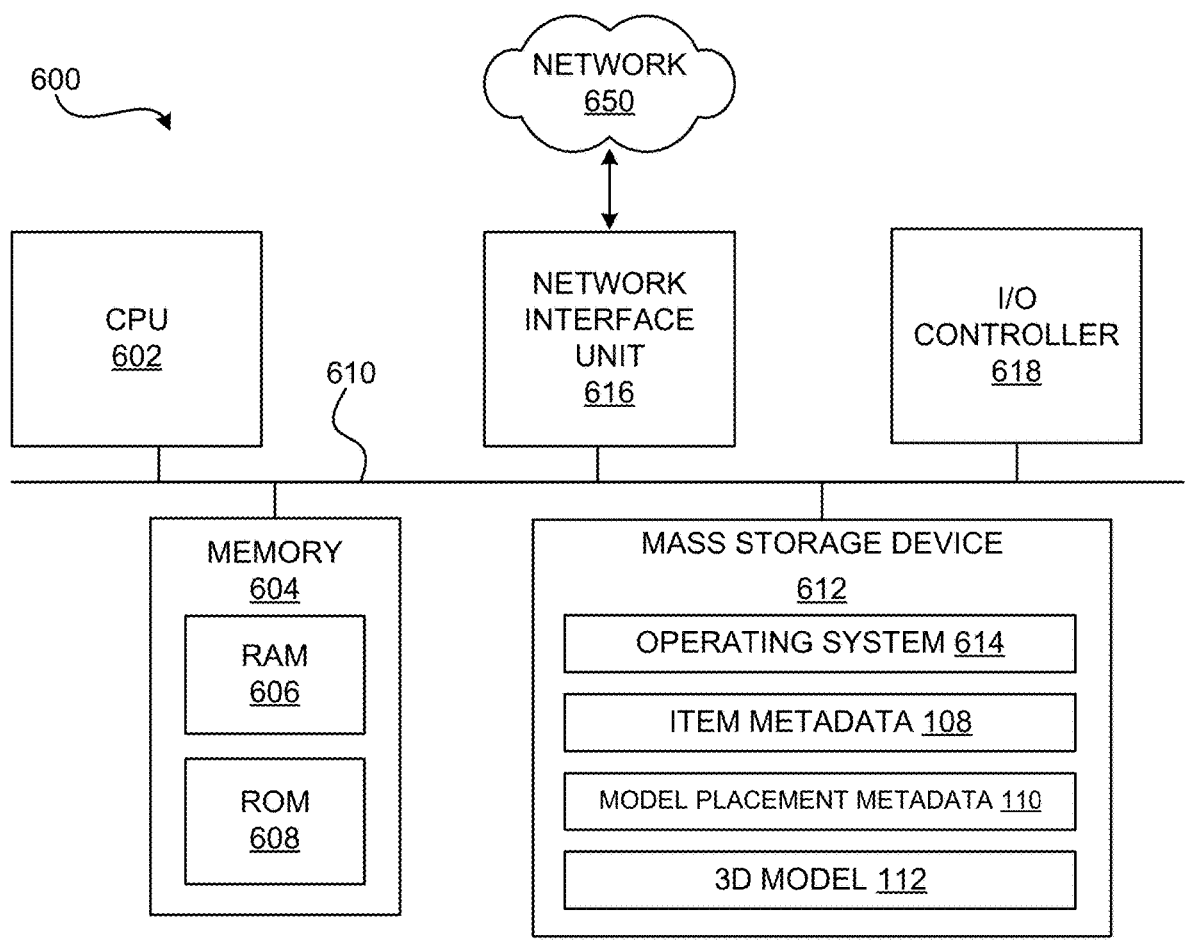
FIG. 6 illustrates additional details of an example computer architecture for a computer capable of implementing aspects of the technologies described herein.

FIG. 6 shows additional details of an example computer architecture for a computer capable of executing the functionalities described herein such as, for example, those described with reference to FIGS. 1A-4, or any program components thereof as described herein. Thus, the computer architecture 600 illustrated in FIG. 6 illustrates an architecture for a server computer, or network of server computers, or any other type of computing device suitable for implementing the functionality described herein. The computer architecture 600 may be utilized to execute any aspects of the software components presented herein, such as software components for implementing the e-commerce system 116 and the item listing tool 102.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the item metadata 108, the model placement metadata 110, or the 3D model 112, and/or any of the other software or data components described herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

According to various implementations, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that a computing system implemented using the disclosed computer architecture 600 to communicate with other computing systems.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including smartphones, embedded computer systems, tablet computers, other types of wearable computing devices, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Illustrative Configurations

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

The disclosure presented herein also encompasses the subject matter set forth in the following clauses:

Clause 1. A computer-implemented method, comprising: receiving a user input at a wearable device, the user input indicating an interest to add a new real-world item to an environment; computing a geometry of the environment and one or more real-world items located in the environment based on image data captured by the wearable device; retrieving a model corresponding to the new real-world item and metadata defining one or more constraints on a presentation of the model when rendered in a view of the environment; analyzing the geometry of the environment and the one or more real-world items to determine a configuration for the model when rendered in the view of the environment that satisfies the constraints; and displaying a rendering of the model in the view of the environment, the rendering of the model presented according to the configuration.

Clause 2. The computer-implemented method of clause 1, wherein the metadata comprises data specifying how the model is to be rendered in the view of the environment relative to a type of real-world item in the environment.

Clause 3. The computer-implemented method of any of clauses 1 or 2, wherein the metadata comprises data specifying that the model is to be rendered in the view of the environment at a location within a threshold distance of a geometric boundary of the environment.

Clause 4. The computer-implemented method of any of clauses 1-3, wherein the metadata comprises data specifying that the model is to be rendered in the view of the environment at a location outside a threshold distance of a geometric boundary of the environment.

Clause 5. The computer-implemented method of any of clauses 1-4, wherein the metadata comprises data specifying that the model is to be rendered in the view of the environment at a location outside a threshold distance of a specific type of real-world item in the environment.

Clause 6. The computer-implemented method of any of clauses 1-5, wherein the configuration for the model comprises a scale, a location, and an orientation of the model in the view of the environment.

Clause 7. The computer-implemented method of any of clauses 1-6, wherein the metadata is defined by a seller of the real-world item.

Clause 8. The computer-implemented method of any of clauses 1-7, wherein the one or more constraints comprise preferred constraints or required constraints.

Clause 9. The computer-implemented method of any of clauses 1-8, wherein the wearable device comprises an augmented reality (AR) device or a virtual reality (VR) device.

Clause 10. An apparatus, comprising: one or more processors; an optical system; a display device; and a memory in communication with the one or more processors, the memory having computer-readable instructions stored thereupon which, when executed by the one or more processors, cause the one or more processors to: compute a geometry of an environment and one or more real-world items located in the environment based on image data captured by the optical system; retrieve a model of a new real-world item and metadata defining one or more constraints on a presentation of the model when rendered in a view of the environment; analyze the geometry of the environment and the one or more real-world items to determine a configuration for the model that satisfies the constraints; and using the configuration to render the model on the display device.

Clause 11. The apparatus of clause 10, wherein the metadata comprises data specifying how the model is to be rendered in the view of the environment relative to a type of real-world item in the environment.

Clause 12. The apparatus of any of clauses 10 or 11, wherein the metadata comprises data specifying that the model is to be rendered in the view of the environment at a location within a threshold distance of a geometric boundary of the environment Clause 13. The apparatus of any of clauses 10-12, wherein the metadata comprises data specifying that the model is to be rendered in the view of the environment at a location outside a threshold distance of a geometric boundary of the environment.

Clause 14. The apparatus of any of clauses 10-13, wherein the metadata comprises data specifying that the model is to be rendered in the view of the environment at a location outside a threshold distance of a specific type of real-world item in the environment.

Clause 15. The apparatus of any of clauses 10-14, wherein the one or more constraints comprise preferred constraints or required constraints.

Clause 16. A computer-implemented method, comprising: receiving a user input at a wearable device, the user input indicating an interest to add a new real-world item to an environment; computing a geometry of the environment and one or more real-world items located in the environment based on image data captured by the wearable device; retrieving a model corresponding to the new real-world item and metadata defining one or more constraints on a presentation of the model when rendered in a view of the environment, wherein the metadata comprises one or more of data specifying how the model is to be rendered in the view of the environment relative to a type of real-world item in the environment, data specifying that the model is to be rendered in the view of the environment at a location within a threshold distance of a geometric boundary of the environment, data specifying that the model is to be rendered in the view of the environment at a location outside a threshold distance of a geometric boundary of the environment, or data specifying that the model is to be rendered in the view of the environment at a location outside a threshold distance of a specific type of real-world item in the environment; analyzing the geometry of the environment and the one or more real-world items to determine a configuration for the model when rendered in the view of the environment that satisfies the constraints; and rendering the model in the configuration on a display device of the wearable device.

Clause 17. The computer-implemented method of clause 16, wherein the configuration for the model comprises a scale, a location, and an orientation of the model in the view of the environment.

Clause 18. The computer-implemented method of any of clauses 16 or 17, wherein the metadata is defined by a seller of the real-world item.

Clause 19. The computer-implemented method of any of clauses 16-18, wherein the one or more constraints comprise preferred constraints or required constraints.

Clause 20. The computer-implemented method of any of clauses 16-19, wherein the wearable device comprises an augmented reality (AR) device or a virtual reality (VR) device.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A computer-implemented method, comprising:
   receiving a plurality of user inputs from a plurality of users indicating a plurality of new real-world items to be added to an item data store;
   for each of the new real-world items, receiving metadata usable to render a 3D model of the new real-world items in a plurality of real-world environments, each real-world item comprising image data representative of a real-world object, the metadata indicative of constraints on how the 3D model is to be rendered in a view of a real-world environment relative to a type of real-world item in the 3D model;
   storing the metadata for the plurality of new real-world items in the item data store;
   listing the new real-world items for availability by a plurality of devices on an electronic platform;
   receiving, from a device of the plurality of devices, a request for one of the new real-world items, the device configured to display a rendering of a 3D model for the new real-world items in a virtual or augmented reality environment, the rendering of the 3D model presented according to the metadata and computation of a geometry of the virtual or augmented reality environment and the requested new real-world item located in the virtual or augmented reality environment based on image data captured by the device;
   retrieving a 3D model corresponding to the requested new real-world item and associated metadata; and
   sending the retrieved 3D model and associated metadata to the device.

2. The computer-implemented method of claim 1, wherein the metadata comprises data specifying how the model is to be rendered in the view of the environment relative to a type of real-world item in the environment.

3. The computer-implemented method of claim 1, wherein the metadata comprises data specifying that the model is to be rendered in the view of the environment at a location within a threshold distance of a geometric boundary of the environment.

4. The computer-implemented method of claim 1, wherein the metadata comprises data specifying that the model is to be rendered in the view of the environment at a location outside a threshold distance of a geometric boundary of the environment.

5. The computer-implemented method of claim 1, wherein the metadata comprises data specifying that the model is to be rendered in the view of the environment at a location outside a threshold distance of a specific type of real-world item in the environment.

6. The computer-implemented method of claim 1, wherein the configuration for the model comprises a scale, a location, and an orientation of the model in the view of the environment.

7. The computer-implemented method of claim 1, wherein the metadata is defined by a seller of the real-world item.

8. The computer-implemented method of claim 1, wherein the one or more constraints comprise preferred constraints or required constraints.

9. The computer-implemented method of claim 1, wherein the device comprises an augmented reality (AR) device or a virtual reality (VR) device.

10. A system, comprising:
    one or more processors; and
    a memory in communication with the one or more processors, the memory having computer-readable instructions stored thereupon which, when executed by the one or more processors, cause the one or more processors to:
    receive, a plurality of user inputs from a plurality of users indicating a plurality of new real-world items to be added to an item data store;
    for each of the new real-world items, receive metadata usable to render a 3D model of the new real-world items in a plurality of real-world environments, each real-world item comprising image data representative of a real-world object, the metadata indicative of constraints on how the 3D model is to be rendered in a view of a real-world environment relative to a type of real-world item in the 3D model;
    list the new real-world items for availability by a plurality of devices on an electronic platform;
    receive, from a device of the plurality of devices, a request for one of the new real-world items, the device configured to display a rendering of a 3D model for the new real-world items in a virtual or augmented reality environment, the rendering of the 3D model presented according to the metadata and computation of a geometry of the virtual or augmented reality environment and the requested new real-world item located in the virtual or augmented reality environment based on image data captured by the device;
    retrieve a 3D model corresponding to the requested new real-world item and associated metadata; and
    send the retrieved 3D model and associated metadata to the device.

11. The system of claim 10, wherein the metadata comprises data specifying how the model is to be rendered in the view of the environment relative to a type of real-world item in the environment.

12. The system of claim 10, wherein the metadata comprises data specifying that the model is to be rendered in the view of the environment at a location within a threshold distance of a geometric boundary of the environment.

13. The system of claim 10, wherein the metadata comprises data specifying that the model is to be rendered in the view of the environment at a location outside a threshold distance of a geometric boundary of the environment.

14. The system of claim 10, wherein the metadata comprises data specifying that the model is to be rendered in the view of the environment at a location outside a threshold distance of a specific type of real-world item in the environment.

15. The system of claim 10, wherein the one or more constraints comprise preferred constraints or required constraints.

16. A computer-implemented method, comprising:
receiving, a plurality of user inputs from a plurality of users indicating a plurality of new real-world items to be added to an item data store;
for each of the new real-world items, receiving metadata usable to render a 3D model of the new real-world items in a plurality of real-world environments, each real-world item comprising image data representative of a real-world object, the metadata indicative of constraints on how the 3D model is to be rendered in a view of a real-world environment relative to a type of real-world item in the 3D model;
storing the metadata for the plurality of new real-world items in the item data store;
listing the new real-world items for availability by a plurality of devices on an electronic platform;
receiving, from a device of the plurality of devices, a request for one of the new real-world items, the device configured to display a rendering of a 3D model for the new real-world items in a virtual or augmented reality environment, the rendering of the 3D model presented according to the metadata and computation of a geometry of the virtual or augmented reality environment and the requested new real-world item located in the virtual or augmented reality environment based on image data captured by the device;
retrieving a 3D model corresponding to the requested new real-world item and associated metadata; and
sending the retrieved 3D model and associated metadata to the device.

17. The computer-implemented method of claim 16, wherein the configuration for the model comprises a scale, a location, and an orientation of the model in the view of the environment.

18. The computer-implemented method of claim 16, wherein the metadata is defined by a seller of the real-world item.

19. The computer-implemented method of claim 16, wherein the one or more constraints comprise preferred constraints or required constraints.

20. The computer-implemented method of claim 16, wherein the device comprises an augmented reality (AR) device or a virtual reality (VR) device.

* * * * *